United States Patent

Nork

[11] Patent Number: 5,973,944
[45] Date of Patent: Oct. 26, 1999

[54] INDUCTORLESS STEP-UP AND STEP-DOWN CONVERTER WITH INRUSH CURRENT LIMITING

[75] Inventor: Samuel H. Nork, Andover, Mass.

[73] Assignee: Linear Technology Corporation, Milpitas, Calif.

[21] Appl. No.: 08/974,292

[22] Filed: Nov. 19, 1997

[51] Int. Cl.$^6$ .............................. H02M 3/18; H02M 3/06
[52] U.S. Cl. ............................ 363/60; 363/62; 323/908; 307/110
[58] Field of Search ....................... 363/59–62; 307/109, 307/110; 323/908

[56] References Cited

U.S. PATENT DOCUMENTS

| | | | |
|---|---|---|---|
| 3,553,479 | 1/1971 | Nelson | 307/110 |
| 4,415,961 | 11/1983 | Harmon, Jr. | 363/43 |
| 4,451,743 | 5/1984 | Suzuki et al. | 307/110 |
| 5,461,557 | 10/1995 | Tamagawa | 363/60 |
| 5,581,454 | 12/1996 | Collins | 363/59 |
| 5,596,489 | 1/1997 | Bazes | 363/62 |

*Primary Examiner*—Peter S. Wong
*Assistant Examiner*—Bao Q. Vu
*Attorney, Agent, or Firm*—Fish & Neave; Robert W. Morris; Brajesh Mohan

[57] ABSTRACT

A switching regulator circuit using a common switch network on a single IC for providing step-up and step-down DC—DC conversion is provided. The switching regulator uses switched capacitor techniques and hence avoids EMI, parasitic and stability concerns particular to inductors and transformers. The converter circuit includes control circuitry for sensing the voltage differential between the input and output to determine whether step-up or step-down mode is to be used. The control circuitry also senses the voltage differential between the input and output and enables the minimum number of switch sections needed to fully regulate the output, using the highest switch resistance possible to minimize inrush current from the input to the output.

48 Claims, 7 Drawing Sheets

INDUCTORLESS STEP-UP AND STEP-DOWN CONVERTER WITH INRUSH CURRENT LIMITING

BACKGROUND OF THE INVENTION

This invention relates to step-up and step-down DC—DC conversion circuits using a single IC (integrated circuit). More particularly, this invention relates to step-up and step-down DC—DC conversion circuits using a single IC, without the use of inductors and without the operational problems associated with high inrush currents common to switched capacitor DC—DC converters.

Voltage regulator circuits are used to provide a regulated output DC voltage over a wide range of unregulated input DC voltages and have been implemented using various techniques. In a switching regulator, the flow of power to a load is regulated by controlling the on and off duty-cycle of one or more power switches coupled to the load. There are several existing topologies for performing step-up or step-down DC—DC conversion.

The single-ended inductor based step-up or step-down conversion topology consists of relatively simple circuits where a switch determines whether the voltage applied to an inductor is $V_{IN}$ or zero. In this manner, the output voltage is a function of the average voltage applied to the inductor. The output voltage varies depending on the configuration of individual components and the class of single-ended inductor circuit. For example, placing the switch in series between the input and the output causes the output voltage to be less than the input voltage. Such a circuit is commonly referred to as a "step-down" or "buck" converter. By placing the switch in parallel with the output, the output voltage can be made to be greater than the input voltage. Such a circuit is commonly referred to as a "step-up" or "boost" converter. Buck and boost circuits may also be combined as a "buck-boost" regulator to provide an inverted-polarity output. One disadvantage of these circuits is that they are inductor based, require numerous external components in addition to IC control, while suffering from EMI, parasitic and stability concerns particular to inductors.

Another known regulator topology is the transformer-coupled switching regulator. This topology provides an increased ability to achieve current or voltage gain, as well as the possibility of isolation between input and output provided by the transformer. As was the case with single-ended inductor regulators, transformer-coupled regulators are also grouped into classes. So-called "flyback converters" use a transformer to transfer energy from input to output. By adjusting the turns ratio (N) between the primary and secondary of the transformer, the regulator may be caused to provide output voltages that are higher or lower than the input voltage. One disadvantage of flyback converters is the high energy that must be stored in the transformer for proper operation. This requires relatively large magnetic cores and may reduce overall circuit efficiency.

The "forward converter" is another class of transformer-coupled regulator. In the forward converter, an additional winding is provided along with other components, such as diodes and capacitors, which essentially eliminates the problem of large stored energy in the transformer core. The additional (or reset) winding normally has a 1:1 turns ratio to the primary winding to help define the switch voltage when the primary switch is turned off. Unfortunately, the turns ratio may limit the duty-cycle of the device to 50% maximum, above which the switch current will typically rise in an uncontrolled manner. If the number of turns on the reset winding is reduced to increase duty-cycle, there is typically a corresponding increase in the level of switch voltage.

It is also possible to provide other combined configurations, such as a "buck-flyback hybrid" converter, in order to attempt to utilize the best properties of different topologies. Previously known buck-flyback converters provide multiple regulated outputs by generating a main output (e.g., 3.3 volts) using a buck converter and adding an auxiliary winding which operates as a flyback converter for a secondary output (e.g., 5 volts). One disadvantage of these converters is the fact that the output power of the auxiliary winding is limited by the output power of the main output. Additionally, when the auxiliary output is heavily loaded, the buck inductor will observe increased output voltage ripple due to the transformer effects of the auxiliary winding. These, as well as other, disadvantages severely limit the input and output operational ranges of these devices. Also, the flyback action of this converter may result in a severely reduced overall efficiency.

Another regulator topology is the switched capacitor switching step-up or step-down converter. Though the switched-capacitor class of step-up or step-down DC—DC converters tend to be the least complex and require the fewest number of external components of all of the topologies, they too are limited in their ability to perform either step-up or step-down function. Moreover, another disadvantage of switched-capacitor converters is that they create large inrush currents from the input voltage, particularly when a large input to output differential voltage exists. Such inrush currents can cause large voltage transients on the input supply, excessive output voltage ripple, and actual over-stress damage to the control IC in extreme cases.

There are few topologies that can perform both step-up and step-down DC—DC conversion. However, these topologies, e.g., SEPIC (single ended primary inductance converter), are inductor or transformer based and, as a result, require numerous external components in addition to the control IC. Consequently, these topologies tend to be more costly and complex than standard step-up or step-down topologies individually. Moreover, these step-up and step-down circuits also suffer from EMI, parasitic and stability concerns particular to inductors.

In view of the foregoing, it would be desirable to provide step-up and step-down DC—DC converter circuits using a common switch network on a single IC that utilizes switched-capacitor techniques.

It would also be desirable to provide step-up and step-down DC—DC converter circuits using a common switch network on a single IC that utilize switched-capacitor techniques while providing inrush current limiting.

SUMMARY OF THE INVENTION

It is an object of this invention to provide step-up and step-down DC—DC converter circuits using a common switch network on a single IC utilizing switched-capacitor techniques.

It is also an object of this invention to provide step-up and step-down DC—DC converter circuits using a common switch network on a single IC that utilize switched capacitor techniques while providing inrush current limiting.

In accordance with the invention, step-up and step-down DC—DC converter circuits using a common switch network on a single IC and switched-capacitor techniques are provided. Additionally, some of the circuits of the present invention also provide inrush current limiting. A common on-chip switch network and two external capacitors are used to perform both switched-capacitor charge pump step-up DC—DC conversion, as well as gated-switch step-down DC—DC conversion. The converter circuits include an input terminal for coupling to a source of input supply voltage, an output terminal for coupling to a load, a common switch network comprising a multiple switches and control circuitry for sensing the voltage differential between the input and output and determining whether step-up or step-down mode is needed. The control circuitry also senses the voltage differential between the input and output to minimize the number of switch sections needed to fully regulate the output, using the highest switch resistance possible to minimize inrush current from the input to the output.

The control circuitry achieves regulated step-up conversion by selectively changing the state of the switches comprising the common switch network, such that charge is transferred from a supply voltage to a first capacitor coupled to the input during one phase of the clock, and charge from the first capacitor is subsequently transferred to a second capacitor coupled to the output during a second phase of the clock, thereby raising the output voltage.

Regulated step-down conversion also is achieved by controlling the state of the switches comprising the common switch network, such that the first capacitor coupled to the input is charged by closing the appropriate switch, while another switch is closed as needed to transfer charge onto the second capacitor. Yet another switch is then opened until the load causes the voltage at the output to droop out of regulation.

The control circuitry also controls the rate of charge transferred per cycle from the input to the output, both during step-up and step-down modes, thereby directly controlling inrush current and output ripple. The rate of charge transferred per cycle from the input to the output is controlled by segmenting the output switch into binary weighted sections that can either be enabled in parallel for a low resistance or in smaller sections for a higher resistance. The control circuitry senses the voltage differential between the voltage at the input and the voltage at the output to minimize the number of switch sections needed to fully charge the capacitor at the output using the highest switch resistance possible to minimize the inrush current.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

BACKGROUND

Figure 1A:
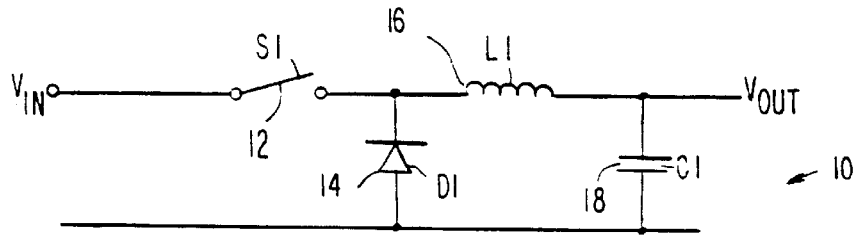
FIGS. 1A–1D are simplified schematic diagrams of known switching voltage regulators.

FIGS. 1A–1D show various known topologies with which to implement basic switching voltage regulators. A typical example of a conventional buck regulator, which provides output voltages at less than the input voltage, is shown in simplified schematic form in FIG. 1A. Buck converter 10 includes switch 12 (S1), diode 14 (D1), inductor 16 (L1) and capacitor 18 (C1). In the buck converter configuration, switch 12 is typically coupled between an input node $V_{IN}$ and one end of inductor 16. The other end of inductor 16 is coupled to an output node $V_{OUT}$. Diode 14 is coupled between ground and a node formed between switch 12 and inductor 16, while capacitor 18 is coupled between $V_{OUT}$ and ground.

The output voltage is the average voltage applied to inductor 16 through switch 12. When switch 12 is closed, diode 14 is reverse biased, and when switch 12 is open, diode 14 will become forward biased. The sequence of open and close actions by switch 12 regulates the voltage such that the longer switch 12 is closed, the higher the regulated voltage (because a higher average current flows through inductor 16). Thus, the duty-cycle of the switch (i.e., the ratio of the time switch 12 is closed to the total time) is an important factor in determining the output voltage of the regulator.

Figure 1B:
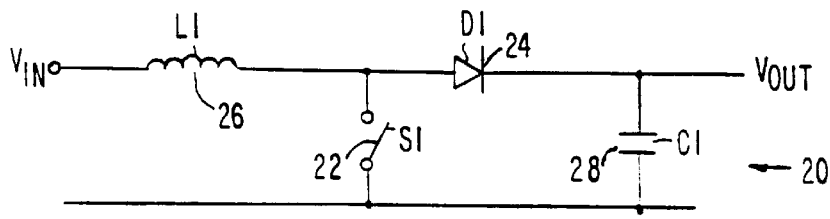

FIG. 1B shows a typical example of a known conventional boost switching regulator, which provides output voltages greater than the input voltage. Boost regulator 20 includes switch 22 (S1), diode 24 (D1), inductor 26 (L1) and capacitor 28 (C1). In the boost regulator configuration, inductor 16 is typically coupled between an input node $V_{IN}$ and the anode of diode 24. The cathode of diode 24 is coupled to an output node $V_{OUT}$. Switch 22 is coupled between ground and a node formed between inductor 26 and diode 24, while capacitor 28 is coupled between $V_{OUT}$ and ground.

The output voltage of boost regulator 20 is regulated above the input voltage as follows. When switch 22 is closed, diode 24 is reverse biased and inductor 26 charges. When switch 22 is open, diode 24 is forward biased and inductor 26 discharges. If switch 22 remained open permanently, $V_{OUT}$ would equal $V_{IN}$ because inductor 26 would be fully discharged, acting only as a DC short circuit. Therefore, until inductor 26 is fully discharged, it contributes energy, over and above the energy from $V_{IN}$, to the output. Once again, the duty-cycle of the switch (which in this case, controls the amount of charge stored on inductor 26) is important in determining the output voltage of the regulator.

Figure 1C:
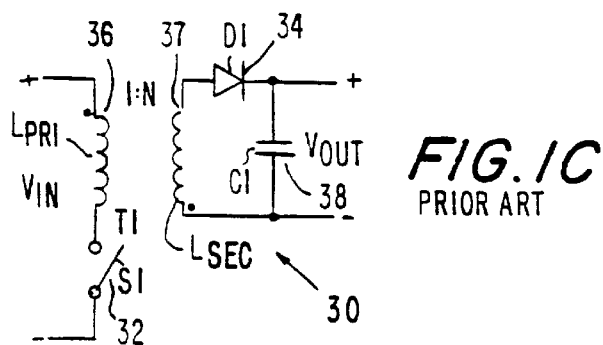

FIG. 1C shows an example of a known flyback regulator topology. Flyback regulator 30 includes many of the same components (switch S1, diode D1 and capacitor C1) as buck converter 10 and boost regulator 20. One difference between the previously discussed topologies and the flyback regulator is that the inductor of the buck and boost circuits is replaced by a transformer T1 in the flyback circuit. The transformer is formed from a primary winding 36 ($L_{PRI}$), having one end coupled to the positive terminal $V_{IN}$ and the other end coupled through switch 32 (S1) to negative terminal $V_{IN}$, and a secondary winding 37 ($L_{SEC}$), having one end coupled to negative terminal $V_{OUT}$ and the other end coupled to the anode of diode 34 (D1). The cathode of diode 34 is coupled to the positive terminal of $V_{OUT}$ and to one end of capacitor 38, while the other end of capacitor 38 is coupled to the negative terminal of $V_{OUT}$.

The turns ratio between $L_{PRI}$ and $L_{SEC}$, commonly expressed as 1:N (where N is the number of winding turns in the secondary for each winding turn in the primary) may be adjusted for optimum power transfer between the input and output. By varying the turns ratio and the duty-cycle of the switch, the flyback regulator is capable of providing output voltage which is higher or lower than the input voltage. This provides more flexibility when compared to the buck and boost circuits, but does so at the disadvantage of requiring high energy storage in the transformer core and, therefore, lower operational efficiency.

Figure 1D:
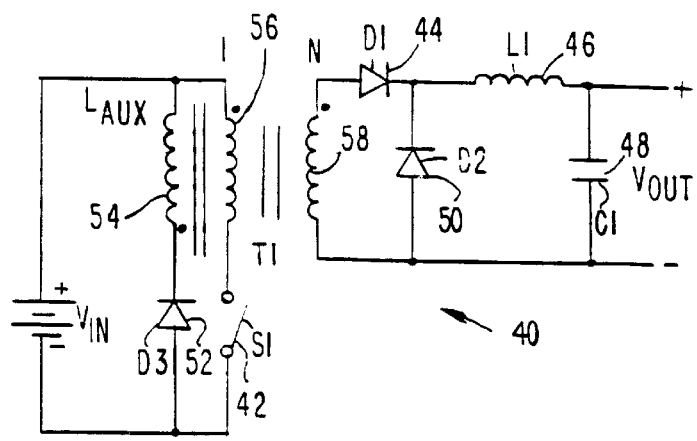
Figure 2:
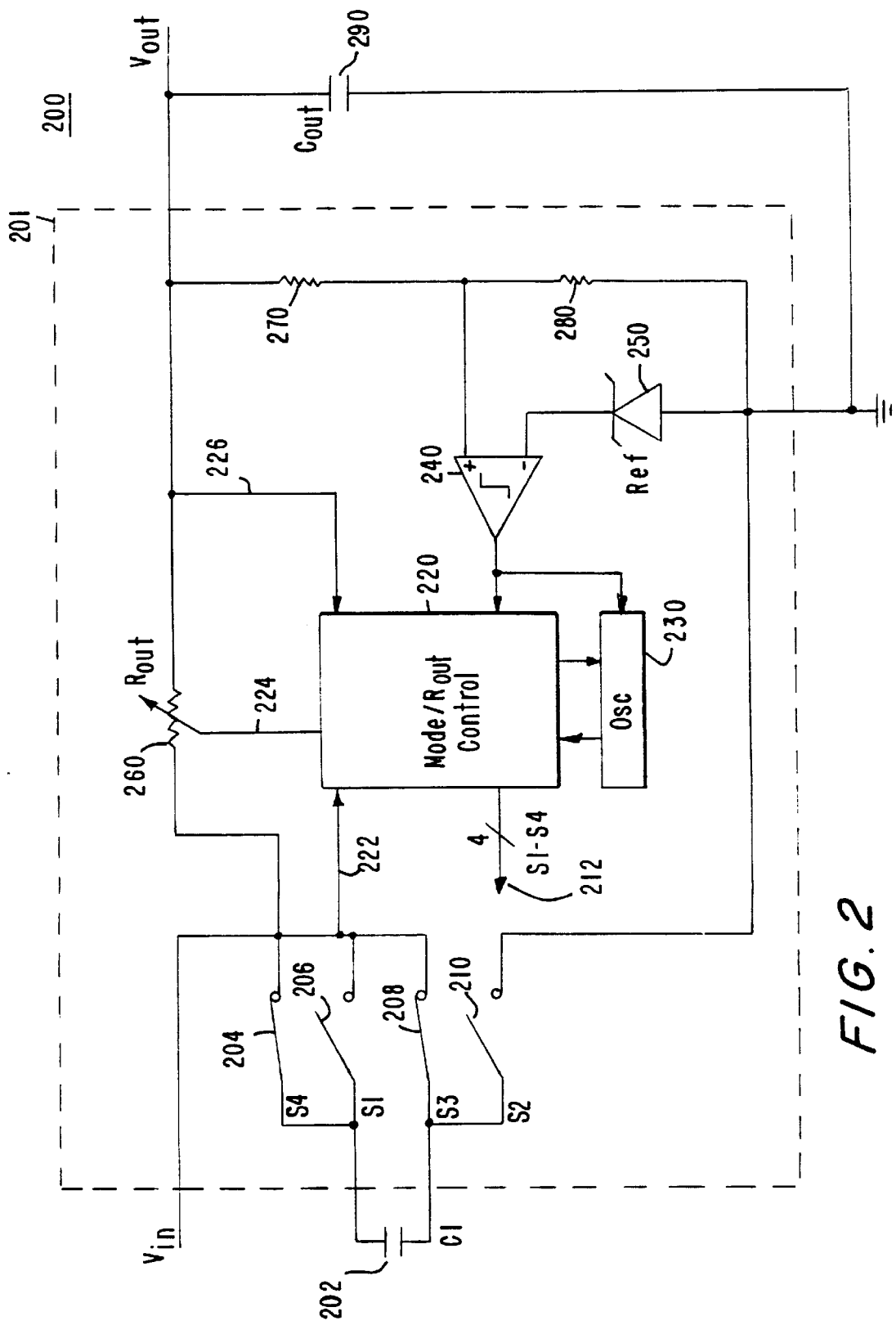
FIG. 2 is a simplified schematic block diagram of an exemplary embodiment of a switched capacitor step-up and step-down DC—DC converter circuit with inrush current limiting in accordance with the principles of the present invention.

A circuit which avoids the problem of large energy storage in the transformer core is shown by conventional forward converter 40 in FIG. 1D. Transformer T1 of forward converter 40 is formed from: (1) primary winding 56 ($L_{PRI}$), which is coupled to positive terminal $V_{IN}$ and through switch 42 (S1) also coupled to negative terminal $V_{IN}$, and (2) secondary winding 58 ($L_{SEC}$). Also coupled across the terminals of $V_{IN}$ is an auxiliary winding 54 ($L_{AUX}$) of transformer T1 in series with diode 52 (D3) (the anode of diode 52 is coupled to the negative terminal of $V_{IN}$). Secondary winding 58 has one end coupled to the negative terminal of $V_{OUT}$ and the other end coupled to the anode of diode 44 (D1). The cathode of diode 44 is coupled to the positive terminal of $V_{OUT}$ via a series connection through filter inductor 46 (L1). The anode of an additional diode 50 (D2) is coupled to the negative terminal of $V_{OUT}$, while the cathode of diode 50 is coupled to a node between diode 44 and inductor 46. As in all of the previous circuits, a capacitor 48 (C1) is coupled across the output terminals.

In the forward converter of FIG. 1D, power is transferred from the input to the load through diode 44 when switch 42 is closed. When switch 42 is open, diode 44 is reverse biased and current flows from inductor 46 through diode 50. The output voltage varies in relation to the duty-cycle of switch 42 and also in relation to the number of turns in secondary winding 58. The auxiliary winding $L_{AUX}$ and diode 52 act to clamp the switch voltage and to hold the magnetic flux in the transformer core at a zero average level when switch 42 is opened. Winding $L_{AUX}$ typically has a 1:1 turns ratio with respect to primary winding $L_{PRI}$, which limits the duty-cycle to 50% maximum. If the number of turns in $L_{AUX}$ is reduced, the duty-cycle may exceed 50%, but this also results in a higher switch voltage. The forward converter provides lower output ripple than flyback converters, but also suffers from increased input ripple current (due to the lower duty-cycle).

Although the last two topologies discussed above are capable of achieving both step-up and step-down regulation, they are transformer based and thus suffer from EMI, parasitic and stability concerns particular to inductors and transformers.

DETAILED DESCRIPTION OF THE INVENTION

The present invention is a switched capacitor step-up and step-down DC—DC converter that uses a single IC with a common on-chip switch network. The IC can also vary the effective output resistance in order to control inrush currents and output ripple. The present invention is not inductor or transformer based and hence avoids the EMI, parasitic, and stability concerns particular to inductors and transformers.

Step-up and step-down regulated DC—DC converter 200 includes capacitor 202 (C1), the top plate of which is coupled to Vin through switch 206 (S1), when closed. Switch 208 (S3), when closed, couples the bottom plate of C1 to Vin. Switch 210 (S2), when closed, couples the bottom plate of C1 to ground. Switch 204 (S4), when closed, couples the top plate of C1 to Vout. Variable resistor 260 (Rout) is coupled between S4 and vout.

Mode/Rout Control 220 controls the state of switches S1, S2, S3 and S4, as well as the resistance of Rout, as indicated by connections 212 and 224, respectively. Connections 222 and 226, respectively, provide Vin and Vout signals to Mode/Rout Control 220. One end of resistor 270 is coupled to a node between Rout and Vout, while the other end is coupled to one end of resistor 280. The other end of resistor 280 is coupled to ground. The non-inverting input of comparator 240 is coupled to a node between resistors 270 and 280, while a reference voltage is coupled to the inverting input of comparator 240. The reference voltage is indicated by zener diode 250 coupled between the inverting input of comparator 240 and ground. Resistors 270 and 280 form a resistor divider that sets the trip point of comparator 240. Capacitor 290 (Cout) is coupled between Vout and ground. The output of comparator 240 is coupled to Mode/Rout Control 220, as well as oscillator 230. The output of Mode/Rout Control 220 is coupled to oscillator 230 and the output of oscillator 230 is coupled to Mode/Rout Control 220. Switches S1, S2, S3, and S4; Mode/Rout Control 220; oscillator 230; comparator 240; zener diode 250; Rout; and resistors 270 and 280 are all on a single IC 201.

Step-up and step-down DC—DC converter 200 may perform step-up and step-down conversion. In step-up conversion, Mode/Rout Control 220 sends control signals to alternatively turn ON (close) and turn OFF (open) switches S1 and S2, and switches S3 and S4, on opposite clock phases based on the internal frequency of oscillator 230. Thus, switches S1 and S2 are operated substantially in phase with one another, and substantially out of phase with switches S3 and S4 (i.e., when switches S1 and S2 are ON, switches S3 and S4 are OFF, and vice versa). When switches S1 and S2 are ON, charge is transferred from Vin onto capacitor C1, during the first phase of the clock. On the second phase of the clock, S3 couples the bottom plate of C1 to Vin and S4 couples the top plate of C1 to Vout through variable resistor Rout. During the second phase, the potential on the top plate of C1 is greater than the potential on Cout, causing charge to be transferred from C1 to Cout, thereby boosting the voltage at Cout. This sequence continues until the output is in regulation, at which point oscillator 230 is turned OFF by comparator 240. When oscillator 230 is turned OFF, the voltage on Cout droops due to load current. When the voltage at Cout has dropped out of regulation, oscillator 230 is turned back ON by the output of comparator 240 and the aforementioned charging cycle is repeated.

Oscillator 230 is turned ON and OFF based on the output of comparator 240. Comparator 240 determines whether Vout is in or out of regulation by comparing the voltage of the resistor divider coupled to its non-inverting input to the reference voltage established by zener diode 250 coupled to its inverting input.

In step-down conversion, Mode/Rout Control 220 sends a control signal to disable oscillator 230. Regulated step-down DC—DC conversion is achieved by keeping switches S1 and S2 closed, keeping switch S3 open, and closing switch S4 to transfer charge onto Cout through Rout as determined by the output of comparator 240. Charge is transferred from Vin to Vout until the output is in regulation. S4 is then held open until the load causes Vout to droop out of regulation.

Alternatively, step-down conversion with the same switch topology as described above, may be achieved by keeping S3 open, S2 closed and switching S1 and S4 with a two phase clock to create a switched capacitor equivalent resistance between Vin and Vout.

Top level schematic block diagram 300 includes voltage sense circuit 400 (PVSENSE) that determines whether to perform step-up or step-down DC—DC conversion. PVSENSE 400 also determines the minimum size output switch necessary to keep the output in regulation. The output of PVSENSE 400 is decoded by mode control and switch segmentation decode logic circuit 500 (PLOGIC), which sends the proper logic control signals to clock generator 330 (PCLKGEN) and level shifter 340 (LSHIFT). PCLKGEN 330 is a level shifted two-phase clock generator with oscillator 230 coupled to one of its inputs. LSHIFT 340 is utilized because PVSENSE 400 and PLOGIC 500 are referenced to Vin, and because switch network driver 600 (PGATEDRV) and switch network 700 (CPP) typically operate at the higher of Vin or Vout.

Figure 3:
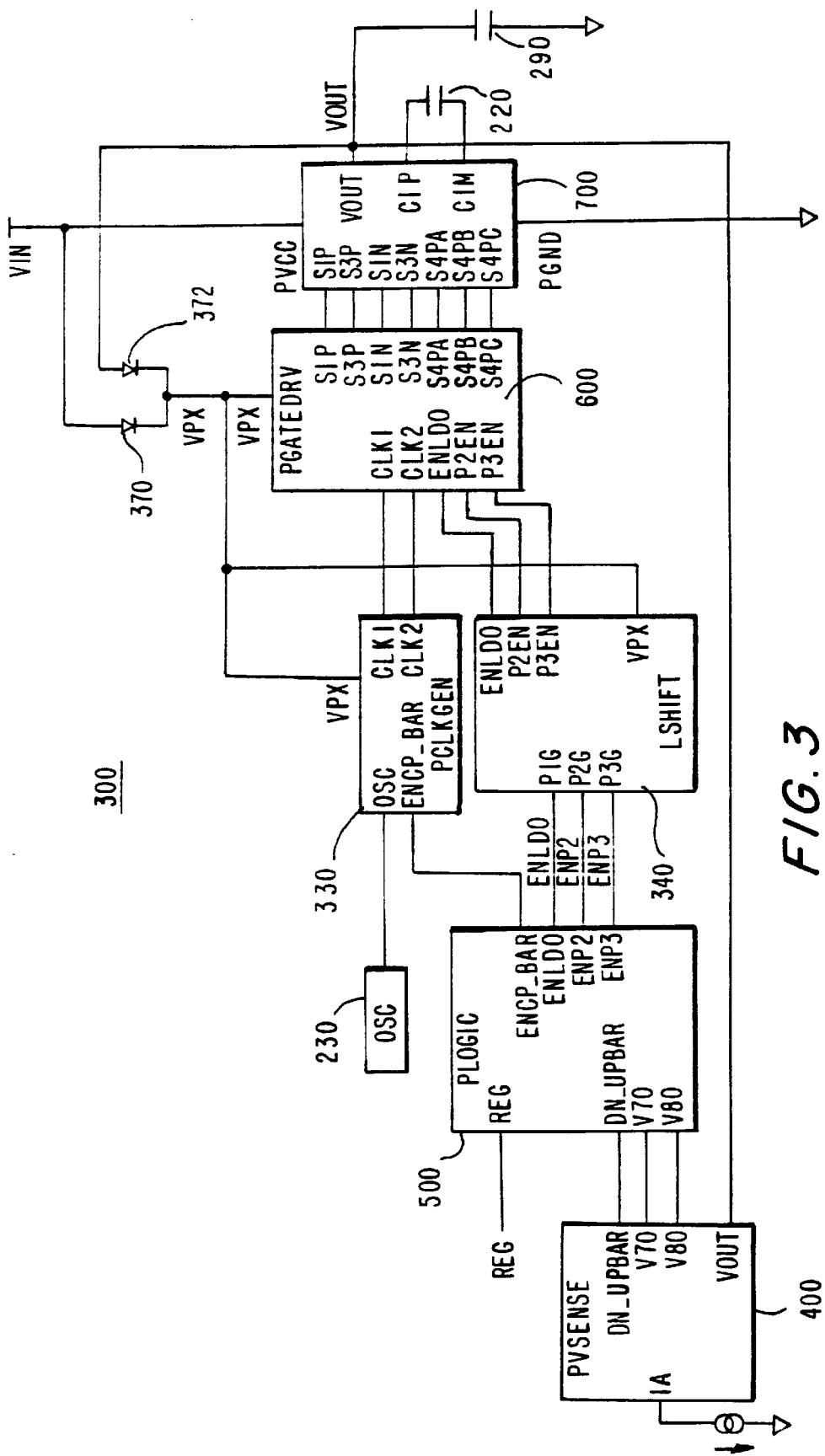
FIG. 3 is a top level schematic block diagram of the switched capacitor step-up and step-down DC—DC converter circuit with inrush current limiting of FIG. 2.

In the embodiment shown in FIG. 3, PCLKGEN 330 generates a two phase 650 KHz non-overlapping clock with VPX2 logic levels. LSHIFT 340 level shifts control signals from Vin logic levels to VPX2 logic levels. LSHIFT 340 actually denotes three level shifters, one for each input signal. Schottky diodes 370 and 372 create an internal rail voltage VPX that provides power to PGATEDRV 600, PCLKGEN 330 and LSHIFT 340. Outputs CLK1 and CLK2 of PCLKGEN 330 and outputs ENLDO, P2EN and P3EN of LSHIFT 340 are coupled to like inputs of PGATEDRV 600. PGATEDRV 600, based upon inputs from PCLKGEN 330 and LSHIFT 340, provides logic control signals to CPP 700. Based upon the logic control signals received by CPP 700, appropriate switches (i.e., S1–4) are opened or closed.

Figure 4:
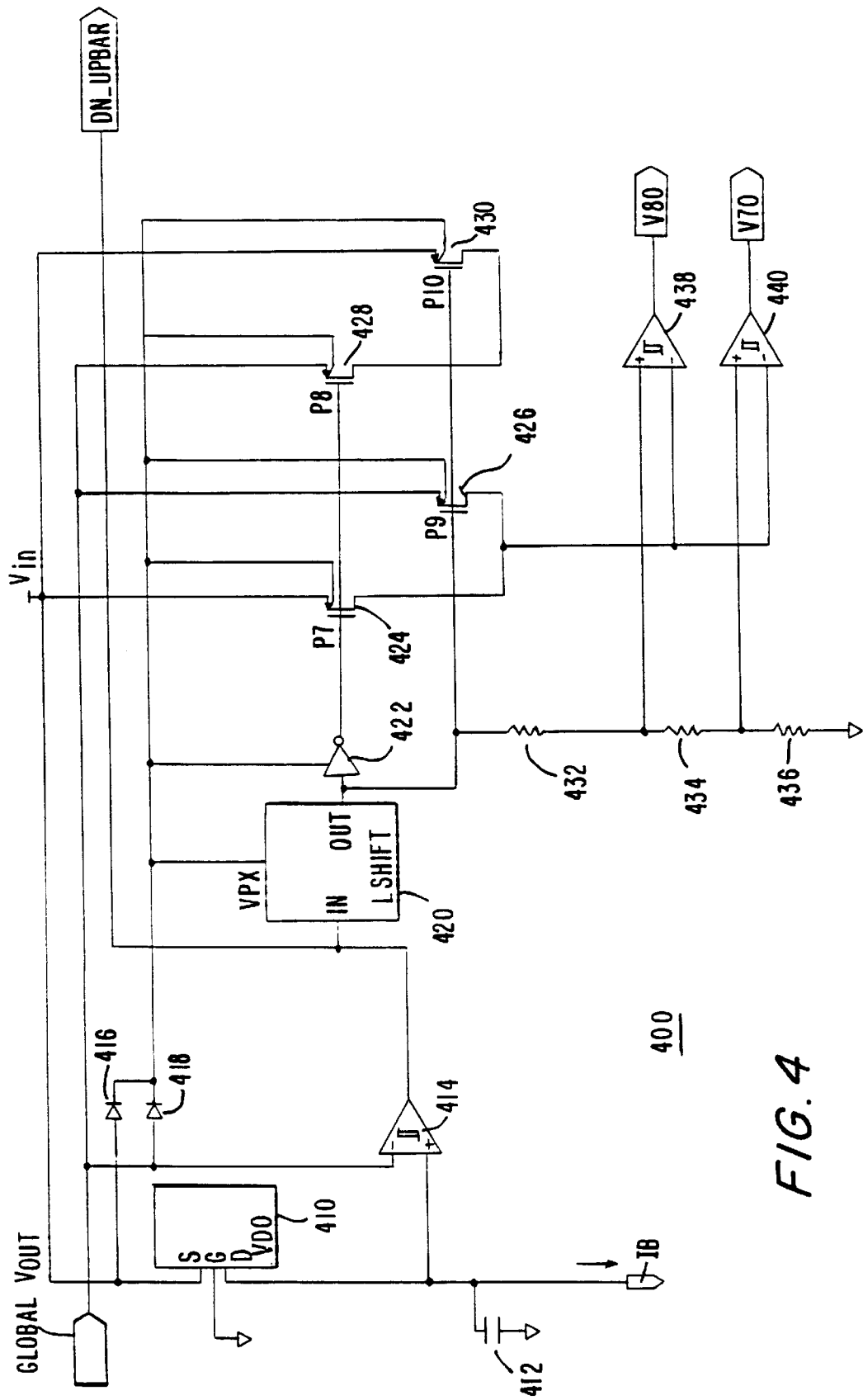
FIG. 4 is a detailed schematic diagram of the voltage sense circuit (PVSENSE) of FIG. 3.

FIG. 4 is a detailed schematic diagram of voltage sense circuit 400 (PVSENSE) of FIG. 3. As described earlier, besides determining whether to perform step-up or step-down DC—DC conversion, PVSENSE 400 also determines the minimum size output switch necessary to keep the output in regulation, thereby limiting inrush current from Vin, particularly when a large input-to-output differential voltage exists.

Figure 7:
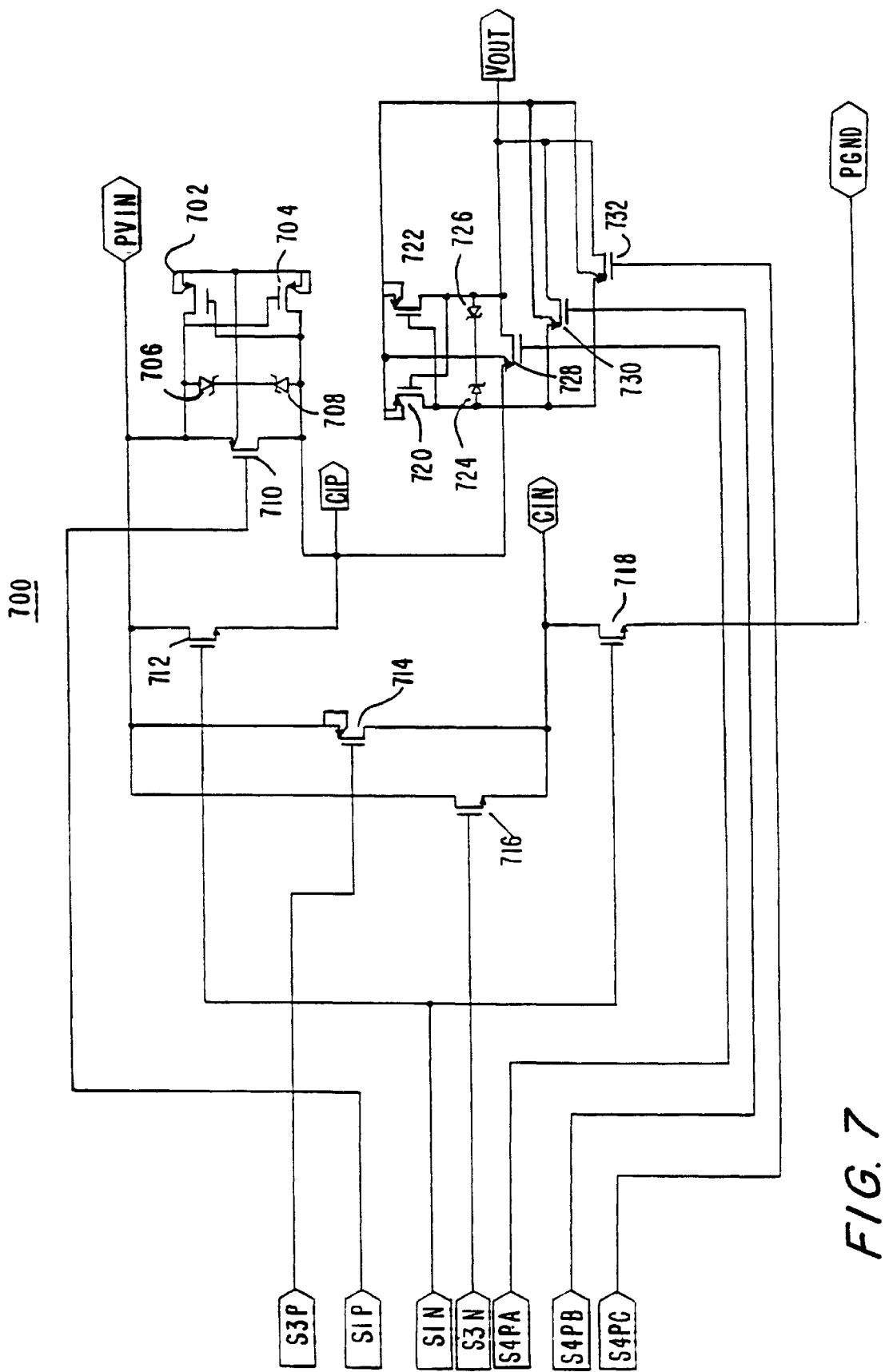
FIG. 7 is a detailed schematic diagram of the switch network (CPP) circuit of FIG. 3

Mode control is determined by the action of comparator 414 (COMP1), maximum load current IB, and voltage drop-out circuit 410 (VDO). In the exemplary embodiment of FIG. 4, the regulator IC is rated for a maximum current of 50 mA. In step-down mode, this current must flow from Vin to Vout through the series combination of MOSFET switches 712 in parallel with 710 and 728 in parallel with 730 in parallel with 732, as shown in FIG. 7. The series resistance of these switches causes a voltage drop (Vdropout) between Vin and Vout when the maximum load current IB (e.g., 50 mA/20,000=2.5 micro amps) is flowing. VDO circuit 410 is equivalent to the 1/20,000th of the series combination of MOSFET switches the current must flow through in step-down mode. This ratio remains constant as Vin varies. By pulling a current equivalent to 1/20,000th of the maximum load current IB through VDO, a voltage drop equivalent to the regulator dropout voltage at maximum load with respect to Vin is created.

Comparator 414 (COMP1) compares the voltage drop (i.e., Vin−Vdropout) with Vout to determine if switch network CPP 700 needs to step-up or step-down. The inverting input of comparator 414 is coupled to Vout and the non-inverting input of comparator 414 is coupled to the output from VDO circuit 410 that is indicative of the difference between Vin and Vdropout. If Vin−Vdropout>Vout, then the output of COMP1 (i.e., DN_UPBAR) is high, indicative of the circuit being in step-down mode. But, if Vin−Vdropout<Vout, then signal DN_UPBAR is low, indicative of the circuit being in step-up mode.

Figure 5:
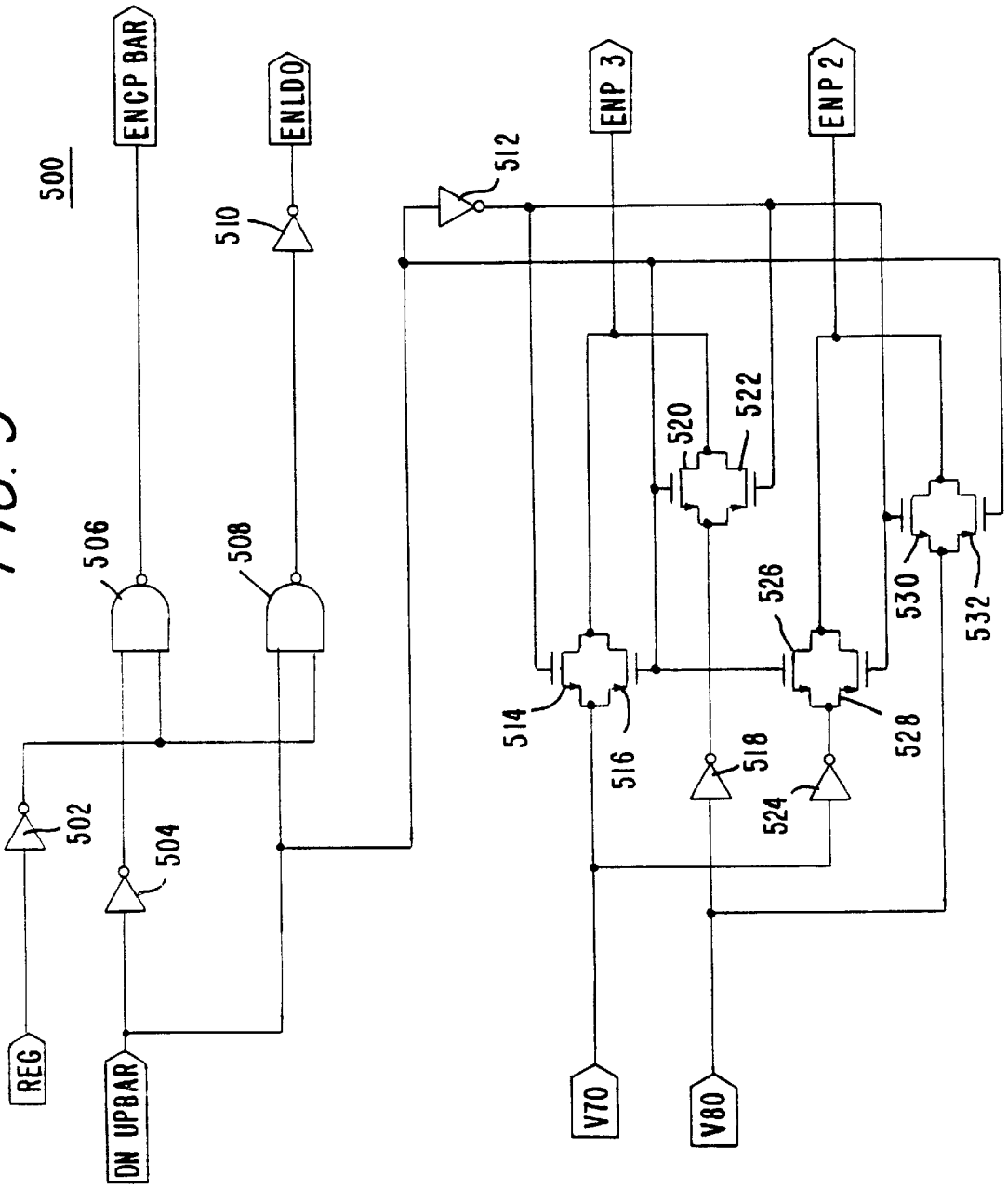
FIG. 5 is a detailed schematic diagram of the mode control and switch segmentation decode logic (PLOGIC) circuit of FIG. 3.

Inrush current limiting (i.e., Rout control) is achieved by the combination of p-channel MOSFETs 424 (P7), 426 (P9), 428 (P8), and 430 (P10); comparators 438 and 440; and the segmentation decode logic 500 (PLOGIC) shown in FIG. 5. Schottky diodes 416 and 418 create internal rail voltage VPX3 that powers level shifting circuit 420, inverter 422 and switches P7–P10. The output of COMP1 controls the state of p-channel MOSFETs P7–P10. MOSFETs P7–P10 act as switches to couple the inputs of 438 and 440 to appropriate voltages, depending on the operating mode of the regulator (i.e., step-up or step-down).

In step-up mode, the inverting inputs of 438 and 440 are coupled to Vin, while in step-down mode, the inverting inputs of 438 and 440 are coupled to Vout. Resistors 432, 434 and 436 form a resistor divider that divides the higher of the two voltages, Vin or Vout, and provides voltage ratios of 70% and 80% of the higher of Vin or Vout relative to the voltage present on the inverting inputs. Though the embodiment in FIG. 4 provides voltage ratios of 70% and 80%, it will be understood to persons skilled in the art that various incremental ratios may be used for higher resolution.

The outputs of comparators 438 and 440 indicate the magnitude of the |Vin−Vout| differential in two quantum steps. These quantum voltage differentials (i.e., V70 and V80) correspond to the size of the output switch necessary to maintain regulation. By using the combination of switches with the highest allowable effective Rout, regulation is achieved and inrush currents are minimized. The outputs of comparators 438 and 440 are decoded by PLOGIC 500 (FIG. 5) in order to determine the switches that are to be used in CPP 700 (FIG. 7).

FIG. 5 shows a detailed schematic diagram of the mode control and switch segmentation (Rout) decode logic circuit 500 (PLOGIC) of FIG. 3. The DN_UPBAR signal of PVSENSE 400 is coupled to input DN_UPBAR of PLOGIC 500. PLOGIC 500, using inverters 502, 504 and 510, and NAND gates 506 and 508, provides control signals ENCP_BAR and ENLDO. A LOW ENCP_BAR control signal enables step-up mode, while a HIGH ENLDO control signal enables step-down mode. The ENCP_BAR control signal from PLOGIC 500, and oscillator 230 are coupled to ENCP_BAR and OSC inputs, respectively, of clock generator 330 (PCLKGEN), as shown in FIG. 3.

Clock generator 330 (PCLKGEN) generates a level shifted two phase clock upon receiving a LOW ENCP_BAR control signal. Charge is transferred from Vin into capacitor 202 (C1) by closing switches 206 (S1) and 210 (S2) at the first phase of the clock pulse. At the second phase of the clock pulse, the bottom plate of capacitor 202 (C1) is coupled to Vin by closing switch 208 (S3) and the top plate of capacitor 202 (C1) is coupled to Vout, through variable resistor 260 (Rout) by closing switch 204 (S4). Hence, charge is transferred from capacitor 202 (C1) to capacitor 290 (Cout) thereby raising the voltage on capacitor 290 (Cout).

The other two outputs of PVSENSE 400, i.e., V70 and V80, are also coupled to similarly named inputs of PLOGIC 500. PLOGIC 500, depending upon the input control signal, and using n-channel MOSFETs 514, 520, 526 and 530; p-channel MOSFETs 516, 522, 528 and 532; and inverters 518 and 524, provides control signals ENP2 and ENP3. Control signals ENLDO, ENP2 and ENP3 are coupled to P1G, P2G and P3G inputs, respectively, of level shifting circuit 340 (LSHIFT), as shown in FIG. 3, which level shifts the received control signals from Vin logic levels to VPX2 logic levels.

Figure 6:
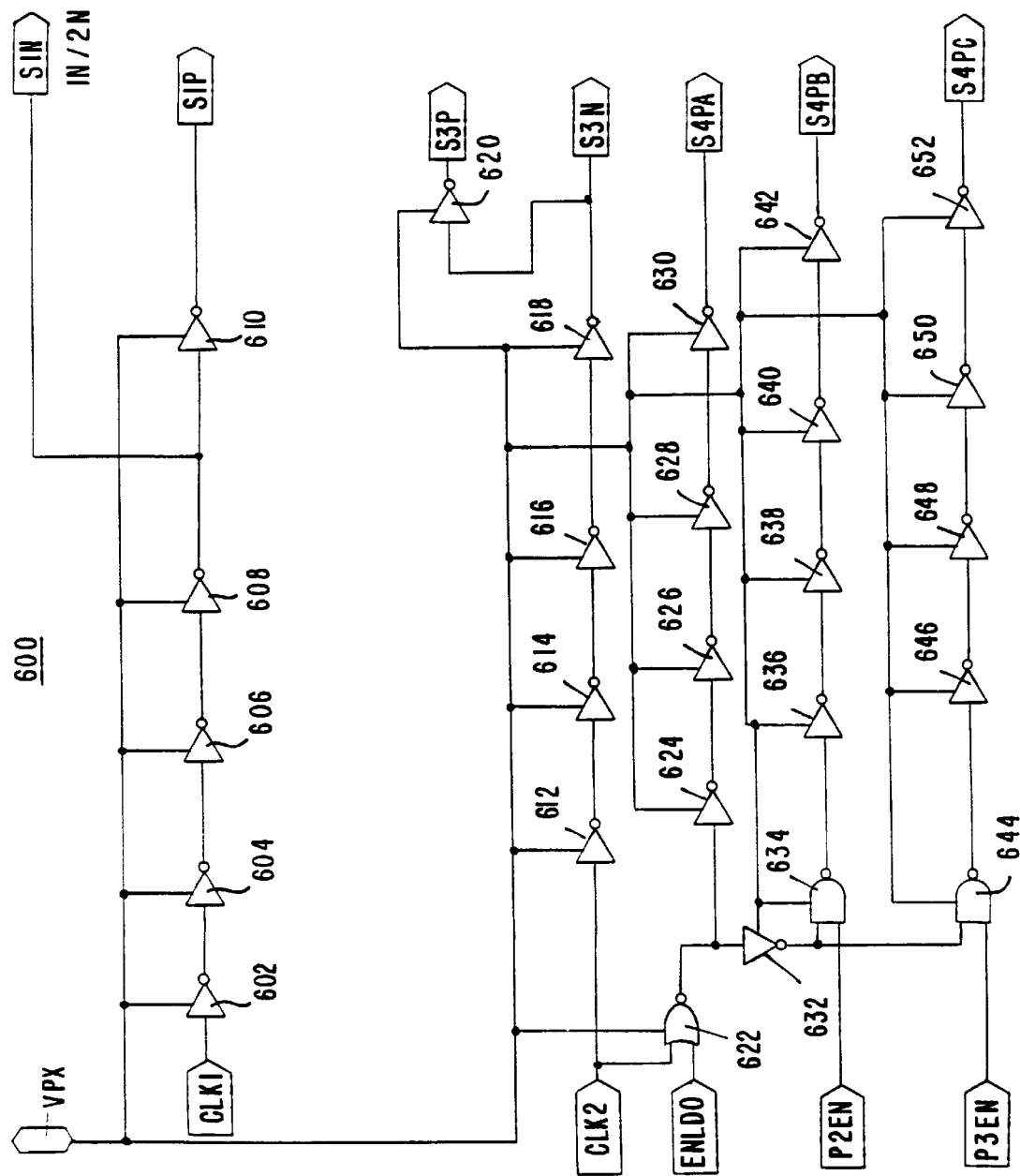
FIG. 6 is a detailed schematic diagram of the level shifted switch network driver (PGATEDRV) circuit of FIG. 3.

The outputs of level shifting circuit 340 (LSHIFT) (i.e., signals ENLDO, P2EN and P3EN) are coupled to similarly named inputs of switch network driver circuit 600 (PGATEDRV). Switch network driver circuit 600 (PGATEDRV) is a level shifted switch network driver (including, as shown in FIG. 6, circuit devices 602, 604, 606, 608, 610, 612, 614, 616, 618, 620, 622, 624, 626, 628, 630, 632, 634, 636, 638, 640, 642, 644, 646, 648, 650 and 652) which based upon clock signals CLK1 and CLK2 from clock generator 330 (PCLKGEN); and control signals ENLDO, P2EN and P3EN from level shifting circuit 340 (LSHIFT) provides control signals S1N, S1P, S3P, S3N, S4PA, S4PB and S4PC to control switches (including switches 710, 712, 714, 716, 718, 728, 730, and 732) in switch network 700.

The output control signals S1N, S1P, S3P, S3N, S4PA, S4PB, and S4PC from switch network driver circuit 600 (PGATEDRV) are coupled to similarly named inputs of switch network 700 (CPP). Switch network 700 (CPP), as shown in FIG. 7, includes schottky diodes 706, 708, 724 and 726 and cross coupled p-channel devices 702, 704, 720 and 722 for biasing the bulk connection of switches 710, 728, 730 and 732 to allow the bulk (an n-Well) to be biased to the higher of either the drain or source voltage and to prevent the bulk from being capacitively pumped to an even higher voltage. Cross-coupled p-channel devices 702, 704, 720 and 722 provide a discharge path if the bulk (n-Well) gets pumped more than one p-channel threshold above the higher of the drain or source voltage. The input control signals determine the size of the output switch necessary to maintain regulation. By using the minimum amount of switch necessary, regulation is achieved and inrush current is limited. It will be readily understood by persons skilled in the art that diodes may be used in place of FET's for switches.

In another embodiment, the gate drive voltage on the output switch may be adjusted to change the effective Rout, whereby the gate drive voltage on the output switch may be increased to lower the effective Rout, and the gate drive voltage on the output switch may be decreased to increase the effective Rout.

Alternatively, the duty cycle of the gate drive to the output switch may be modulated. Thus, the higher the ratio of the gate drive ON to gate drive OFF, the lower the effective Rout, and the lower the ratio of the gate drive ON to gate drive OFF, the higher the effective Rout.

Although preferred embodiments of the inventions have been disclosed, with various components connected to other components, persons skilled in the art will appreciate that it may not be necessary for such connections to be direct and additional components may be interconnected between the shown components without departing from the spirit of the invention as shown. One skilled in the art will appreciate that the present invention can be practiced by other than the described embodiments, which are presented for purposes of illustration and not of limitation, and the present invention is limited only by the claims which follow.

What is claimed is:

1. A step-up/step-down DC—DC converter circuit located on an integrated circuit comprising:

an input terminal for receiving a source of electric potential from a charge capacitor wherein said charge capacitor is external to said integrated circuit;

an output terminal coupled to an output, said output coupled to an output capacitor wherein said output capacitor is external to said integrated circuit;

a common switch network located on said integrated circuit comprising a plurality of switches that selectively couples said charge capacitor to said input terminal and selectively couples said charge capacitor to said output capacitor; and a control circuit located on said integrated circuit coupled to said common switch network for determining whether said converter circuit operates in step-up mode or step-down mode, and for opening and closing said plurality of switches accordingly to provide said step-up mode or step-down mode DC voltage at said output terminal.

2. The converter circuit of claim 1, wherein said plurality of switches comprises:

a first switch coupled between a top plate of said charge capacitor and said input terminal;

a second switch coupled between a bottom plate of said charge capacitor and ground;

a third switch coupled between said bottom plate of said charge capacitor and said input terminal; and a fourth switch coupled between said top plate of said charge capacitor and a top plate of said output capacitor.

3. The converter circuit of claim 2, wherein said step-up mode is accomplished by closing said first and second switches during a first clock phase and closing said third and fourth switch during a second clock phase while opening said first and second switches, said first and second switches operating substantially in phase with one another and substantial out of phase with said third and fourth switches.

4. The converter circuit of claim 2, wherein said step-down mode is accomplished by closing said first and second switches and opening said third switch while said fourth switch is selectively closed to transfer charge onto said output capacitor and selectively opened to cause said output terminal to drop out of regulation.

5. The converter circuit of claim 2, wherein said step-down mode is accomplished by closing said second switch and opening said third switch, opening said first switch and closing said fourth switch during a first clock phase, and opening said fourth switch and closing said first switch during a second clock phase, wherein said first and fourth switches operate substantially out of phase with one another.

6. The converter circuit of claim 1, wherein said plurality of switches comprise MOSFETs.

7. The converter circuit of claim 1 further comprising a comparator circuit coupled between said control circuit and said output terminal.

8. The converter circuit of claim 7, wherein said comparator circuit comprises:

a voltage divider formed from a first resistor and a second resistor, said first resistor coupled at one end to a node between said fourth switch and said output terminal and coupled at the other end to one end of said second resistor, the other end of said second resistor being coupled to ground; and a comparator having a non-inverting input coupled to a node between said first and second resistors and an inverting input coupled to a reference voltage.

9. The converter circuit of claim 7, wherein said comparator circuit provides a control signal indicative of whether said converter circuit is in regulation.

10. The converter circuit of claim 1, wherein said control circuit comprises:

a voltage sense circuit coupled to said output terminal;

a mode control decode logic circuit coupled to said voltage sense circuit; and a level shifted switch network driver circuit coupled to said mode control decode logic circuit.

11. The converter circuit of claim 10, wherein said voltage sense circuit comprises:

a voltage dropout circuit that provides a voltage drop equivalent to the difference between voltage at said input terminal and the voltage drop between said input terminal and said output terminal when a maximum current flows through said converter circuit and said converter circuit is in said step-down mode DC—DC conversion.

12. The converter circuit of claim 11, further comprising a comparator having an inverting input coupled to said output terminal and a non-inverting input coupled to said output of said voltage dropout circuit.

13. The converter circuit of claim 12, wherein said comparator provides a control signal indicative of whether said converter circuit operates in said step-up mode or said step-down mode.

14. The converter circuit of claim 10, wherein said mode control decode logic circuit provides a first control signal that, when low, indicates said step-up mode.

15. The converter circuit of claim 10, wherein said mode control decode logic circuit provides a second control signal to said level shifted switch network driver circuit that, when high, indicates said step-down mode.

16. The converter circuit of claim 10, wherein said mode control decode logic circuit provides control signals to said level shifted switch network driver circuit that determines the state of said plurality of switches.

17. In a converter circuit located on an integrated circuit, said converter circuit adapted to be coupled to a source of electrical potential at an input terminal, said converter circuit having an output terminal, a method for performing step-up mode and step-down mode DC—DC conversion, said converter circuit comprising a common switch network comprising a plurality of switches for at least selectively coupling a first capacitor coupled to said input terminal to a second capacitive element coupled to said output terminal, and a control circuit coupled to said common switch network for selectively opening and closing said plurality of switches, said method comprising:

sensing whether said converter circuit is in regulation or out of regulation;

determining whether said step-up mode or said step-down mode DC—DC conversion is required and deriving status information regarding said plurality of switches of said common switch network to provide said step-up mode or step-down mode DC voltage at said output terminal; and varying the OPEN and CLOSE states of said plurality of switches in response to said status information to operate said converter circuit in said determined mode of DC—DC conversion.

18. The method of claim 17, wherein said sensing comprises:

comparing the voltage at said output terminal to a reference voltage and providing a control signal indicative of whether said converter circuit is in regulation.

19. The method of claim 17, wherein said determining comprises:

comparing the difference between the voltage at said input terminal and the voltage drop between said input terminal and said output terminal when a maximum current flows through said converter circuit and said converter circuit is in said step-down mode DC—DC conversion.

20. The method of claim 17, wherein said varying, to achieve said step-up DC—DC conversion, comprises:

coupling a top plate of a first capacitor to said input terminal by closing a first switch during a first clock phase;

coupling a bottom plate of said first capacitor to ground by closing a second switch during said first clock phase;

coupling said bottom plate of said first capacitor to said input terminal by closing a third switch during a second clock phase while said first and second switches are open; and coupling said top plate of said first capacitor to a top plate of a second capacitor by closing a fourth switch while said first and second switches are open, wherein said first and second switches operate substantially in phase with one another, and substantially out of phase with said third and fourth switches.

21. The method of claim 17, wherein said varying to achieve said step-down DC—DC conversion comprises:

closing a first switch to couple a top plate of a first capacitor to said input terminal;

closing a second switch to couple a bottom plate of said first capacitor to ground;

keeping a third switch coupled between said input terminal and said bottom plate of said first capacitor open; and selectively closing a fourth switch to transfer charge onto a second capacitor and selectively opening said fourth switch to cause said output terminal to drop out of regulation, said fourth switch being opened and closed while said first and second switches remain closed and said third switch remains open.

22. A step-up mode and step-down mode DC—DC converter circuit comprising:

an input terminal for coupling to a source of electric potential;

an output terminal;

a common switch network comprising a plurality of switches for selectively coupling a first capacitor to said input terminal and for selectively coupling said first capacitor to a second capacitor coupled to said output terminal, wherein at least one of said plurality of switches is segmented into a plurality of binarily weighted sections; and a control circuit coupled to said common switch network that determines whether said step-up mode or said step-down mode DC—DC conversion is required and opening and closing said plurality of switches accordingly, and that determines the resistance of said segmented switch to perform inrush current limiting.

23. The converter circuit of claim 22, wherein said common switch network further comprises:

a first switch coupled between a top plate of said first capacitor and said input terminal;

a second switch coupled between a bottom plate of said first capacitor and ground;

a third switch coupled between said bottom plate of said first capacitor and said input terminal; and a fourth switch coupled between said top plate of said first capacitor and a top plate of said second capacitor.

24. The converter circuit of claim 23, wherein said fourth switch is segmented into three binarily weighted sections.

25. The converter circuit of claim 22, wherein said plurality of switches comprise MOSFETs.

26. The converter circuit of claim 22, wherein said plurality of binarily weighted sections comprise MOSFETs.

27. The converter circuit of claim 22, wherein said binarily weighted sections control the resistance of said at least one of said plurality of switches.

28. The converter circuit of claim 22, wherein said at least one of said plurality of switches has a least switch resistance when all of said plurality of binarily weighted sections are enabled in parallel.

29. The converter circuit of claim 22, wherein said at least one of said plurality of switches has a highest switch resistance if said plurality of binarily weighted sections are enabled in smaller pieces.

30. The converter circuit of claim 22 further comprising a comparator circuit coupled between said control circuit and said output terminal.

31. The converter circuit of claim 30, wherein said comparator circuit provides a control signal indicative of said converter circuit being either in or out of regulation.

32. The converter circuit of claim 30, wherein said comparator circuit comprises:
 a voltage divider formed from a first resistor and a second resistor, said first resistor coupled at one end to a node between said fourth switch and said output terminal and coupled at the other end to one end of said second resistor, the other end of said second resistor being coupled to ground; and
 a comparator having a non-inverting input coupled to a node between said first and second resistors and an inverting input coupled to a reference voltage.

33. The converter circuit of claim 22, wherein said control circuit includes:
 a voltage sense circuit coupled to said output terminal;
 a mode control decode logic circuit coupled to said voltage sense circuit; and
 a level shifted switch network driver circuit coupled to said mode control decode logic circuit.

34. The converter circuit of claim 33, wherein said voltage sense circuit includes:
 a voltage dropout circuit that provides a voltage drop equivalent to the difference between voltage at said input terminal and the voltage drop between said input terminal and said output terminal when a maximum current flows through said converter circuit and said converter circuit is in said step-down mode DC—DC conversion.

35. The converter circuit of claim 34, further comprising a comparator having an inverting input coupled to said output terminal and a non-inverting input coupled to said output of said voltage dropout circuit.

36. The converter circuit of claim 35, wherein said comparator provides a control signal indicative of whether said converter circuit operates in said step-up mode or said step-down mode.

37. The converter circuit of claim 33, wherein said voltage sense circuit further comprises an inrush current limiting circuit.

38. The circuit of claim 37, wherein said inrush current limiting circuit comprises:
 a level shifting circuit, said level shifting circuit coupled at its input to said comparator;
 a plurality of switches, the state of said switches determined by the output of said level shifting circuit;
 a resistor divider that divides the higher of the voltage at said input terminal and said output terminal into a plurality of unique output voltages at a plurality of output nodes; and
 a plurality of comparators having outputs and having their non-inverting inputs coupled to a respective one of said plurality of output nodes and having their inverting inputs coupled to the lower of the voltage at said input terminal and said output terminal.

39. The converter circuit of claim 38, wherein said outputs of said plurality of comparators correspond to the size of said at least one of said plurality of switches, and are each coupled to a respective input of said mode control decode logic circuit.

40. The circuit of claim 33, wherein said mode control decode logic circuit outputs a first control signal to a clock circuit, and a second, a third and a fourth control signal to said level shifted switch network driver.

41. The circuit of claim 33, wherein said level shifted switch network driver determine the state of said plurality of switches comprising said common switch network.

42. In a converter circuit adapted to be coupled to a source of electrical potential at an input terminal, said converter circuit having an output terminal, a method for performing step-up mode and step-down mode DC—DC conversion, said converter circuit comprising a common switch network comprising a plurality of switches for at least selectively coupling a first capacitor coupled to said input terminal to a second capacitor coupled to said output terminal, wherein at least one of said plurality of switches is segmented into a plurality of binarily weighted sections, and a control circuit coupled to said common switch network for selectively opening and closing said plurality of switches and determining the resistance of said segmented switch to perform inrush current limiting, said method comprising:
 sensing whether said converter circuit is in regulation or out of regulation;
 determining whether said step-up mode or said step-down mode DC—DC conversion is required and deriving status information regarding said plurality of switches; and
 varying said OPEN and CLOSE states of said plurality of switches in response to said status information to operate said converter circuit in said determined mode of DC—DC conversion.

43. The method of claim 42, wherein said sensing comprises:
 comparing the voltage at said output terminal to a reference voltage and providing a control signal indicative of whether said converter circuit is in regulation.

44. The method of claim 42, wherein said determining comprises:
 comparing the difference between the voltage at said input terminal and the voltage drop between said input terminal and said output terminal when a maximum current flows through said converter circuit and said converter circuit is in said step-down mode DC—DC conversion.

45. The method of claim 42, wherein said deriving comprises:
 comparing the output of at least one of a plurality of resistor dividers dividing the higher of the voltage of said input terminal and said output terminal to the lower of the voltage at said input terminal and said output terminal; and
 controlling said open and close states of said plurality of switches in response to said comparing.

46. The method of claim 45, wherein said controlling further comprises:
 selecting the combination of said plurality of binarily weighted sections with the highest allowable effective resistance based upon said comparing.

47. The method of claim 42, wherein said varying, to achieve said step-up DC—DC conversion, comprises:

coupling a top plate of a first capacitor to said input terminal by closing a first switch during a first clock phase;

coupling a bottom plate of said first capacitor to ground by closing a second switch during said first clock phase;

coupling said bottom plate of said first capacitor to said input terminal by closing a third switch during a second clock phase while said first and second switches are open; and coupling said top plate of said first capacitor to a top plate of a second capacitor by closing a fourth switch while said first and second switches are open, wherein said first and second switches operate substantially in phase with one another, and substantially out of phase with said third and fourth switches.

48. The method of claim 42, wherein said varying to achieve said step-down DC—DC conversion comprises:

closing a first switch to couple a top plate of a first capacitor to said input terminal;

closing a second switch to couple a bottom plate of said first capacitor to ground;

keeping a third switch coupled between said input terminal and said bottom plate of said first capacitor open; and selectively closing a fourth switch to transfer charge onto a second capacitor and selectively opening said fourth switch to cause said output terminal to drop out of regulation, said fourth switch being opened and closed while said first and second switches remain closed and said third switch remains open.

\* \* \* \* \*